(12) United States Patent
Thornburg et al.

(10) Patent No.: US 6,366,350 B1
(45) Date of Patent: Apr. 2, 2002

(54) APPARATUS FOR TRANSMITTING LIGHT SOURCE TO A LIGHT DETECTOR

(75) Inventors: Thomas J. Thornburg, Marion; Ryan J. Rand, Cedar Rapids, both of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/643,586

(22) Filed: Aug. 22, 2000

(51) Int. Cl.⁷ .................................................. G01J 1/42
(52) U.S. Cl. ....................................................... 356/222
(58) Field of Search ................................ 356/445, 448, 356/43, 46, 73, 47, 50, 213, 222, 121; 250/574, 216, 227.25, 341.8; 385/88–91; 372/36, 50, 92, 96; 362/802; 359/867, 534

(56) References Cited

U.S. PATENT DOCUMENTS

| | | | |
|---|---|---|---|
| 4,956,591 A | * 9/1990 | Schierbeek et al. | ......... 318/483 |
| 4,974,552 A | * 12/1990 | Sickafus | ....................... 123/1 |
| 5,191,204 A | * 3/1993 | Dickson et al. | .......... 250/208.2 |
| 5,414,257 A | * 5/1995 | Stanton | ................. 250/227.25 |
| 5,438,586 A | * 8/1995 | Ishii et al. | ..................... 372/50 |
| 5,661,303 A | * 8/1997 | Teder | ...................... 250/341.8 |
| 5,812,582 A | * 9/1998 | Gilliland et al. | .............. 372/50 |
| 5,997,185 A | * 12/1999 | Kropp | .......................... 385/89 |
| 6,018,165 A | * 1/2000 | Kerkmann et al. | ......... 250/574 |
| 6,188,427 B1 | * 2/2001 | Anderson et al. | ........... 347/255 |

* cited by examiner

*Primary Examiner*—Frank G. Font
*Assistant Examiner*—Michael P. Stafira
(74) *Attorney, Agent, or Firm*—Nathan O. Jensen; Kyle Eppele

(57) ABSTRACT

A light reflector for use with a light source and a light detection mechanism is disclosed. The light source and the light detection mechanism are mounted on a substrate. The light reflector includes a generally hollow portion having a first end and a second end. A reflective surface is disposed upon the first end of the generally hollow portion. The second end is attached to the substrate such that the substrate and the light reflector define a substantially airtight enclosure that is of sufficient size to accommodate therein the light source and the light detection mechanism.

12 Claims, 2 Drawing Sheets

APPARATUS FOR TRANSMITTING LIGHT SOURCE TO A LIGHT DETECTOR

FIELD OF THE INVENTION

The present invention relates to optics, and more particularly, to systems that monitor the brightness of light sources.

BACKGROUND OF THE INVENTION

Light-emitting diodes (LED's) are an efficient, reliable, low-cost light source that can be used in many applications. Recent advances in LED technology have produced a variety of colors of LED's with high luminosity per unit of required power. Such LED's can be advantageously arranged in an array and used as a backlight for a liquid-crystal display. To save time and space, it may be possible to attach the LED's directly on a planar circuit card or a printed wiring board.

Although LED's have been found to be a reliable light source, in avionics and in other critical systems it may be necessary to monitor the output of the LED's to guard against failure and to ensure constant brightness levels over time. Typically an optical feedback system is used to monitor the LED's. An optical feedback system uses a light sensor such as a photodiode that is disposed near one or more of the LED's in the array. If an LED fails, a change in brightness is detected by the photodiode and an appropriate signal is sent to a processor. The processor can then take appropriate action to compensate for the failed LED and can also alert a user or technician about the failure.

It has been difficult to use optical feedback techniques with LED arrays that are disposed on planar circuit boards or cards and printed wiring boards. This is because most commercially available LED's emit light in a direction away from the circuit board to which they are attached, and most photodiodes are built to detect light that is emitted from a place other than the circuit board to which the photodiode is attached. In other words, most photodiodes are not designed to accurately detect light from an LED that is attached to the same planar substrate as the photodiode. One possible solution has been to mount the photodiode above the circuit board and point the photodiode toward the board-mounted LED. However, this solution requires a mechanical mount that is attached to the circuit board and requires hand-wiring of the photodiode to the circuitry on the circuit board. This increases the expense and time required to assemble the circuit board. Furthermore, because the electrical connection between the photodiode and the circuit board is lengthened, the photodiode has an increased sensitivity to noise.

Another challenge to effective optical feedback techniques arises when it is desired for a photodiode to monitor the brightness of more than one LED. To effectively monitor multiple LED's, the light detected by the photodiode under normal conditions should be comprised of equal amounts of light from each LED. In practice, however, it is difficult to position the LED's with respect to the photodiode to detect equal amount of light from each LED.

Still another problem is that contaminants such as dust and other airborne particulates between the LED's and the photodiode can create inaccuracies in the brightness measurements by the photodiode. The effectiveness of the optical feedback is therefore compromised.

It is therefore an object of the invention to increase the effectiveness of an optical feedback system.

It is another object of the invention to provide a way to detect light from an light source using a light-detecting mechanism, wherein the light source and the light-detecting mechanism are mounted on a substantially planar substrate.

A feature of the invention is a device that reflects light from a substrate-mounted LED toward a substrate-mounted light detector.

An advantage of the invention is that the brightness of light from a light source can be easily and inexpensively monitored.

SUMMARY OF THE INVENTION

The invention provides a light reflector for use with a light source and a light detection mechanism, the light source and the light detection mechanism being mounted on a substrate. The light reflector includes a generally hollow portion. The generally hollow portion has a first end and a second end. A reflective surface is disposed upon the first end of the generally hollow portion. The second end is attached to the substrate such that the substrate and the light reflector define a substantially airtight enclosure that is of sufficient size to accommodate therein the light source and the light detection mechanism.

The invention also provides an apparatus for measuring the brightness of light. The apparatus includes a light source mounted on a planar substrate. A light detection mechanism is mounted on the planar substrate adjacent the light source. A light-reflecting component has a reflective surface disposed thereon. The reflective surface is positioned to reflect the light emitted from the light source toward the light detection mechanism. The light detection mechanism measures the brightness of the light emitted from the light source.

The invention also provides a method of detecting the brightness of light that is emitted by an LED. According to the method, the LED is mounted on a substantially planar substrate. A light detection mechanism is mounted on the substrate adjacent the LED. A light-reflecting component is mounted on the substrate such that the light-reflecting component and the substrate substantially enclose the LED and the light detection mechanism. The LED is caused to emit light, and the brightness of the light that is reflected by the light-reflecting component and thereby directed toward the light detection mechanism is measured.

DETAILED DESCRIPTION OF THE DRAWINGS

Figure 1:
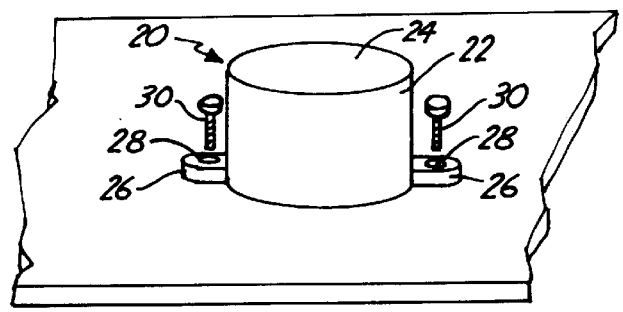
FIG. 1 is a perspective view of the light-reflecting component according to one embodiment of the invention.
Figure 2:
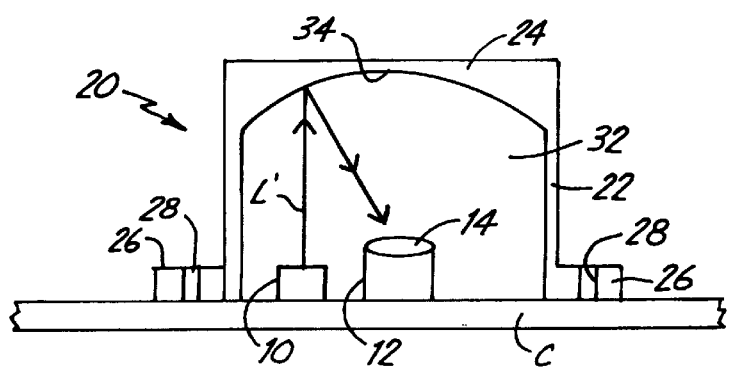
FIG. 2 is an interior view of the light-reflecting component shown in FIG. 1.

FIGS. 1 and 2 depict an embodiment of the invention in which a light-emitting element, shown as an LED 10, is attached to a planar substrate such as a circuit board C. LED 10 emits light L in a direction away from circuit board C. A light-detecting mechanism, shown in the Figures as a photodiode 12, is secured to circuit board C adjacent LED 10. Photodiode 12 has a light-sensitive area 14 that is oriented away from circuit board C. As previously explained, because of the orientations of LED 10 and photodiode 12 it is difficult for light from LED 10 to be detected by photodiode 12.

To solve this problem, the invention uses a light-reflecting component, shown as a light integrator 20, to reflect light from LED 10 to light-sensitive area 14 of photodiode 12. As shown in FIGS. 1 and 2, light integrator 20 has a generally cylindrical portion 22 terminating in an end 24. Flanges 26 extend outwardly from cylindrical portion 22 and have holes 28 disposed therein. Screws 30 pass through holes 28 and provide a means of attaching light integrator 20 to circuit board C.

FIG. 2 shows the interior of light integrator 20. It can be seen that the interior of light integrator 20 is generally hollow. When attached to circuit board C, light integrator 20 forms a substantially airtight enclosure 32. Light integrator 20 is of a sufficient size to permit LED 10 and photodiode 12 to be situated within enclosure 32. The inner surface 34 of curved portion 24 is reflective and is so shaped to reflect light L emitted by LED 10 toward light-sensitive area 14 of photodiode 12. In this fashion, light integrator 20 reflects light from LED 10 and directs the light toward light-sensitive area 14 of photodiode 12.

Because photodiode 12 is only measuring the brightness of the light emitted by LED 10, Inner surface 34 does not need to be highly polished to ensure total specular reflection; it is acceptable that light contacting inner surface 34 be partially diffusely reflected. Light integrator 20 may therefore be made of a single piece of cast or machined aluminum or other metal. This one-piece design for light integrator 20 saves manufacturing time and expense.

Figure 3:
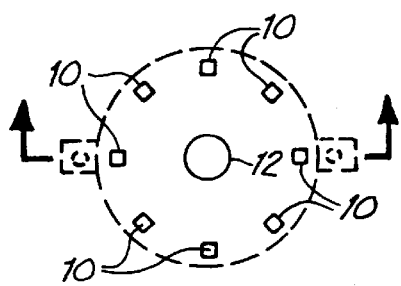
FIG. 3 is a top plan view showing an arrangement of a plurality of light sources according to another embodiment of the invention.
Figure 4:
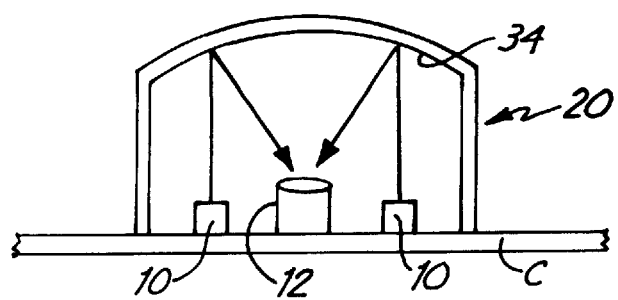
FIG. 4 is a cross-section view taken along line 4—4 in FIG. 3.

The invention has been shown as being used to reflect light from a single light source toward a photodiode. However, light integrator 20 may be used to reflect a plurality of light sources toward a light detection mechanism. FIGS. 3 and 4 show photodiode 12 being surrounded by a plurality of LED's 10. The LED's are arranged equidistant from light-sensitive area 14 of photodiode 12 so that the photodiode receives an equal amount of light from each LED. In this manner, a plurality of light sources can be monitored by the photodiode.

Figure 5:
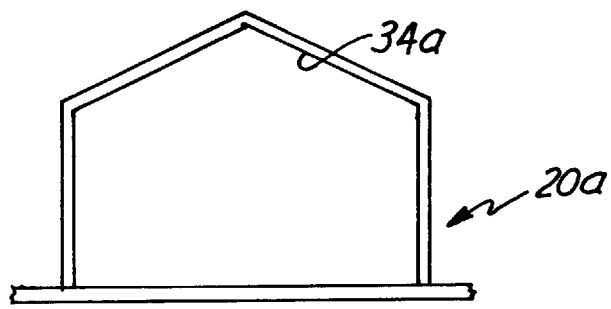
FIG. 5 is a side elevational view of a light-reflecting component according to still another embodiment of the invention.
Figure 6:
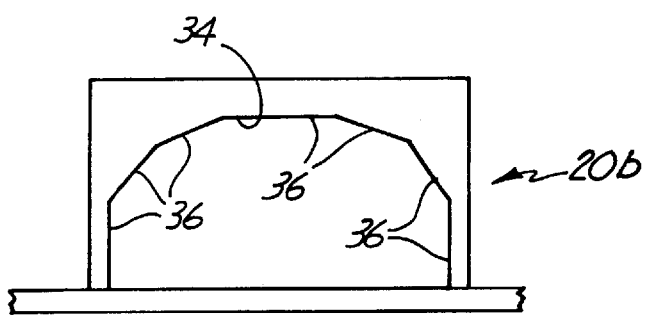
FIG. 6 is a side elevational view of a light-reflecting component according to yet another embodiment of the invention.
Figure 7:
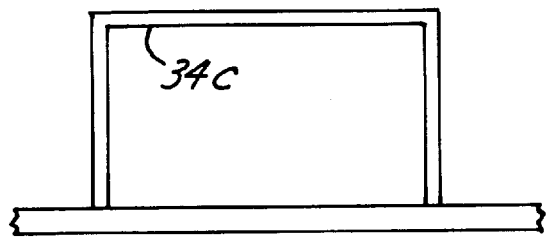
FIG. 7 is a side elevational view of a light-reflecting component according to yet another embodiment of the invention.

The specific topology of inner surface 34 can be varied depending on the type or number of light sources included within enclosure, the ease or cost of manufacturing, or other factors. For instance, inner surface 34 may be frustospherical, parabolic, dome-shaped, or curved in other shapes. FIG. 5 shows a light integrator 20a having a conical inner surface 34a. FIG. 6 shows a light integrator 20b having a faceted inner surface 34b that is comprised of a plurality of polygonal or non-polygonal facets or faces 36. The inner surface may also be planar, as shown in FIG. 7 at 34c.

The invention can be varied in other ways. For instance, the substrate may comprise a printed circuit board, a printed wiring board, a circuit card, or any other substantially planar surface. In addition, the light integrator may be made of a non-metallic material. The light integrator may be formed principally of a non-reflective material with reflective coating applied to inner surface 34. For example, the light integrator may be made of molded plastic, and a silver-colored paint may be sprayed or otherwise applied to the inner surface.

An advantage of the invention is that light integrator may be quickly secured directly to the substrate. No mechanical mount or complex wiring schemes are required to advantageously position the LED relative to the photodiode. This saves assembly time and expense. The elimination of mechanical mounts also preserves the substantially planar nature of the circuit board and therefore conserves valuable space. The elimination of additional wiring reduces the possibility that electrical noise may compromise the signal from the photodiode.

Another advantage of the invention is that the light integrator is inexpensive to manufacture. In many applications the reflective inner surface is an integral part of the light integrator. No additional surface preparation is necessary in such applications.

Another advantage is that because enclosure 32 is airtight, dust cannot enter enclosure 32 and interfere with the measurement of light.

Another advantage is that the light integrator can be used to monitor the brightness of multiple LED's. For instance, if multiple LED arrays are included in a display, the invention eliminates the need to provide separate feedback structures for each LED array. The invention also makes it possible to monitor the brightness of different portions of a single LED array.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An apparatus for measuring the brightness of light, comprising:
   a light source mounted on a planar substrate;
   a light detection mechanism mounted on the planar substrate adjacent the light source; and
   a light-reflecting component having a reflective surface disposed thereon, the reflective surface positioned to reflect the light emitted from the light source toward the light detection mechanism, the reflective surface being arranged such that light cannot pass therethrough,
      wherein the light detection mechanism measures the brightness of the light emitted from the light source.

2. The apparatus of claim 1, wherein the reflective surface includes a curved portion.

3. The apparatus of claim 2, wherein the reflective surface is at least partially spherical.

4. The apparatus of claim 1, wherein the reflective surface is non-coplanar with the substrate.

5. The apparatus of claim 1, wherein the light-reflecting component and the substrate enclose the light source and the light detection mechanism.

6. The apparatus of claim 1, wherein the light-reflecting component is mounted on the substrate.

7. The apparatus of claim 1, wherein the light source is a light-emitting diode.

8. The apparatus of claim 1, wherein the light source is a plurality of light-emitting diodes.

9. The apparatus of claim 8, wherein the plurality of light-emitting diodes are arranged equidistant from the light detection mechanism.

10. The apparatus of claim 9, wherein the substrate and the light-reflecting component define a substantially airtight enclosure around the light detection mechanism and the plurality of light-emitting diodes.

11. The apparatus of claim 1, wherein the substrate is a circuit board.

12. A method of detecting the brightness of light that is emitted by an LED, comprising:

mounting the LED on a substantially planar substrate;

mounting a light detection mechanism on the substrate adjacent the LED;

mounting a light-reflecting component on the substrate such that the light-reflecting component and the substrate substantially enclose the LED and the light detection mechanism, the light-reflecting component including a reflective surface that reflects light from the LED and directs the light toward the light detection mechanism, the reflective surface being arranged such that light cannot pass therethrough;

causing the LED to emit light; and measuring the brightness of the light from the LED that is reflected by the reflective surface and thereby directed toward the light detection mechanism.

* * * * *